(12) United States Patent
Furukawa et al.

(10) Patent No.: US 7,851,064 B2
(45) Date of Patent: Dec. 14, 2010

(54) METHODS AND STRUCTURES FOR PROMOTING STABLE SYNTHESIS OF CARBON NANOTUBES

(75) Inventors: Toshiharu Furukawa, Essex Junction, VT (US); Mark Charles Hakey, Fairfax, VT (US); Steven John Holmes, Guilderland, NY (US); David Vaclav Horak, Essex Junction, VT (US); Charles William Koburger, III, Delmar, NY (US); Peter H. Mitchell, Jericho, VT (US); Larry Alan Nesbit, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/031,493

(22) Filed: Feb. 14, 2008

(65) Prior Publication Data

US 2008/0160312 A1    Jul. 3, 2008

Related U.S. Application Data

(62) Division of application No. 10/733,974, filed on Dec. 11, 2003, now Pat. No. 7,374,793.

(51) Int. Cl.
*B32B 9/00* (2006.01)
(52) U.S. Cl. ................... 428/408; 977/742
(58) Field of Classification Search ............ 428/408; 423/447.1; 977/742
See application file for complete search history.

(56) References Cited

U.S. PATENT DOCUMENTS

| | | | |
|---|---|---|---|
| 5,796,573 | A | 8/1998 | Kotecki et al. |
| 6,250,984 | B1 | 6/2001 | Jin et al. |
| 6,423,583 | B1 | 7/2002 | Avouris et al. |
| 6,465,132 | B1 * | 10/2002 | Jin .................... 429/231.8 |
| 6,515,325 | B1 | 2/2003 | Farnworth et al. |
| 6,737,939 | B2 * | 5/2004 | Hoppe et al. .......... 333/186 |
| 6,858,891 | B2 | 2/2005 | Farnworth et al. |
| 6,891,227 | B2 | 5/2005 | Appenzeller et al. |
| 2002/0001905 | A1 | 1/2002 | Choi et al. |

(Continued)

FOREIGN PATENT DOCUMENTS

EP    1331671 A1    7/2003

(Continued)

OTHER PUBLICATIONS

Ruzyllo, "Semiconductor Glossary", printed from the internet Jun. 12, 2009 http://semiconductorglossary.com/default.asp?SearchField=Yes&SearchTerm=wafer.

(Continued)

*Primary Examiner*—David R Sample
*Assistant Examiner*—Daniel Miller
(74) *Attorney, Agent, or Firm*—Wood, Herron & Evans, LLP

(57) ABSTRACT

Methods for synthesizing carbon nanotubes and structures formed thereby, includes forming carbon nanotubes on a plurality of synthesis sites supported by a first substrate, interrupting nanotube synthesis, mounting a free end of each carbon nanotube to a second substrate, and removing the first substrate. Each carbon nanotube is capped by one of the synthesis sites, to which growth reactants have ready access.

7 Claims, 5 Drawing Sheets

U.S. PATENT DOCUMENTS

| | | | |
|---|---|---|---|
| 2002/0014667 A1* | 2/2002 | Shin et al. | 257/368 |
| 2002/0163079 A1 | 11/2002 | Awano | |
| 2003/0132461 A1 | 7/2003 | Roesner et al. | |
| 2003/0168683 A1 | 9/2003 | Farnworth et al. | |
| 2003/0170930 A1 | 9/2003 | Choi et al. | |
| 2003/0178617 A1 | 9/2003 | Appenzeller et al. | |
| 2003/0227015 A1 | 12/2003 | Choi et al. | |
| 2003/0230760 A1 | 12/2003 | Choi et al. | |
| 2005/0056826 A1 | 3/2005 | Appenzeller et al. | |
| 2005/0130341 A1 | 6/2005 | Furukawa et al. | |
| 2005/0167655 A1 | 8/2005 | Furukawa et al. | |
| 2005/0167740 A1 | 8/2005 | Furukawa et al. | |
| 2005/0167755 A1 | 8/2005 | Dubin et al. | |
| 2005/0179029 A1 | 8/2005 | Furukawa et al. | |

FOREIGN PATENT DOCUMENTS

| | | |
|---|---|---|
| EP | 1361608 A2 | 11/2003 |
| EP | 1420414 A1 | 11/2003 |
| EP | 1435660 A2 | 7/2004 |
| JP | 2003264249 A | 9/2003 |
| JP | 2004517489 A | 6/2004 |
| WO | 03063208 A2 | 7/2003 |
| WO | 03081687 A2 | 10/2003 |
| WO | 2004040616 A2 | 5/2004 |
| WO | 2004040668 A2 | 5/2004 |
| WO | 2004105140 A1 | 12/2004 |

OTHER PUBLICATIONS

Electron Beam Lithography [online], [retrieved on Dec. 15, 2008]. Retrieved from the Internet <URL: http://en.wikipedia.org/wiki/Electron_beam_lithography>, 7 pages.

"IBM Scientists Develop Carbon Nanotube Transistor Technology," IBM.com News, news report concerning work published in Science, vol. 292, Issue 5517, Apr. 27, 2001 entitled "Engineering Carbon Nanotubes and Nanotube Circuits Using Electrical Breakdown" by Avouris, et al. (3 pages).

"Carbon Nanotube Arrays: Synthesis of Dense Arrays of Well-Aligned Carbon Nanotubes Completely Filled with Titanium Carbide on Titanium Substrates," Batelle No. 12132 (1 page).

Cao, et al., "Grapevine-like Growth of Single Walled Carbon Nanotubes Among Vertically Aligned Multiwalled Nanotube Arrays", Applied Physics Letters vol. 79, No. 9, Aug. 27, 2001 (pp. 1252-1254).

Chang, "Integration of Nanotubes into Devices", National Nanofabrication Users Network, Stanford Nanofabrication Facility, p. 58.

Choi, et al., "Ultrahigh-Density Nanotransistors by Using Selectively Grown Vertical Carbon Nanotubes", Applied Physics Letters, vol. 79, No. 22, Nov. 26, 2001, pp. 3696-3698.

Collins, et al., "Nanotubes for Electronics," Scientific American, Dec. 2000, pp. 62-69.

Collins, et al., "Engineering Carbon Nanotubes and Nanotube Circuits Using Electrical Breakdown," Science, vol. 292, Apr. 27, 2001, pp. 706-709.

Cui, et al., "Growth Behavior of Carbon Nanotubes on Multilayered Metal Catalyst Film in Chemical Vapor Deposition," Chemical Physics Letters 374 (2003), pp. 222-228.

Derycke, et al., "Carbon Nanotube Inter- and Intramolecular Logic Gates," Nano Letters, xxxx, vol. 0, No. 0, A-D, received Aug. 16, 2001 (4 pages).

Duesberg, et al., "Ways Toward the Scaleable Integration of Carbon Nanotubes into Silicon Based Technology", Diamond and Related Materials 13 (2004) pp. 354-361.

Duesberg, et al., "Large-Scale Integration of Carbon Nanotubes into Silicon Based Microelectronics", Proceedings of SPIE vol. 5118 (2003), pp. 125-137.

Gorman, "Nanoscale Networks: Superlong Nanotubes Can Form a Grid," Science News Online, week of May 3, 2003, vol. 163, No. 18. (3 pages).

Harris, "Carbon Nanotubes and Related Structures," Cambridge University Press, 1999 (pp. 15-60).

Huang, et al. "Growth of Highly Oriented Carbon Nanotubes by Plasma-Enhanced Hot Filament Chemical Vapor Deposition", Applied Physics Letters, vol. 73, No. 26, Dec. 28, 1998, pp. 3845-3847.

Jung, et al., "Growth of Carbon Nanotubes by Chemical Vapor Deposition", Diamond and Related Materials 10 (2001) pp. 1235-1240.

Kalaugher, "Tiny Nanotubes Set New Record," Nanotechweb.org, Aug. 7, 2003 (1 page).

Kiang, "Growth of Large-Diameter Single-Walled Carbon Nanotubes," J. Phys. Chem. A 2000, 104, 2454-2456.

Li, et al., "Highly-Ordered Carbon Nanotube Arrays for Electronics Applications," Applied Physics Letters, vol. 75, No. 3, Jul. 19, 1999, pp. 367-369.

Li, et al. "Bottom-Up Approach for Carbon Nanotube Interconnects," NASA Ames Research Center, received Dec. 5, 2002, accepted Jan. 31, 2003 (1 page).

Mo, et al, "The Growth Mechanism of Carbon Nanotubes from Thermal Cracking of Acetylene Over Nickel Catalyst Supported on Alumina," Synthetic Metals 122 (2001) pp. 443-447.

Ploenjes, et al., "Single-Walled Carbon Nanotube Synthesis in CO Laser Pumped Carbon Monoxide Plasmas," Ohio State University, Oct. 10, 2001 (1 page).

Plonjes, et al., "Synthesis of Single-Walled Carbon Nanotubes in Vibrationally Non-Equilibrium Carbon Monoxide," Chemical Physics Letters 352 (2002) pp. 342-347.

Popov, "Carbon Nanotubes: Properties and Application", Materials Science and Engineering R. vol. R43, No. 3, pp. 61-102, Jan. 15, 2004 (1 page).

Ren, et al., "Synthesis of Large Arrays of Well-Aligned Carbon Nanotubes on Glass," Science, vol. 282, Nov. 6, 1998, pp. 1105-1107.

Ren, et al., "Large Arrays of Well-Aligned Carbon Nanotubes," Proceedings of 13th International Winter School on Electronic Properties of Novel Materials, pp. 263-267, Feb. 27-Mar. 6, 1999, Kirchberg / Tirol, Austria.

Ren, et al., "Growth, Characterization, and Potential Applications of Periodic Carbon Nanotube Arrays," Department of Physics, Boston College, updated 2001 (2 pages).

Zhu, et al., "Direct Synthesis of Long Single-Walled Carbon Nanotube Strands," Science, vol. 296, May 3, 2002, pp. 884-886.

Teo, "Catalytic Synthesis of Carbon Nanotubes and Nanofibers," Encyclopedia of Nanoscience and Nanotechnology, vol. X, pp. 1-22, 2003.

Wind, et al., "Vertical Scaling of Carbon Nanotube Field-Effect Transistors Using Top Gate Electrodes," Applied Physics Letters, vol. 80, No. 20, May 20, 2002, pp. 3817-3819.

"Synthesis of CNT's," http://nepp.nasa.gov/index—nasa.cfm/769/#synthesis (7 pages).

Zhang, et al., "Electric-Field-Directed Growth of Aligned Single-Walled Carbon Nanotubes," Applied Physics Letters, vol. 79, No. 19, Nov. 5, 2001, pp. 3155-3157.

Zhao, et al., "Film Growth of Pillars of Multi-Walled Carbon Nanotubes," J. Phys.: Condens., Matter 15 (2003), L565-L569.

Zheng, et al., "Efficient CVD Growth of Single-Walled Carbon Nanotubes on Surfaces Using Carbon Monoxide Precursor," Nano Letters, xxxx, vol. 0., No. 0, A-D, xxxx American Chemical Society, received Jun. 4, 2002, revised Jun. 26, 2002, (3 pages).

* cited by examiner

METHODS AND STRUCTURES FOR PROMOTING STABLE SYNTHESIS OF CARBON NANOTUBES

CROSS-REFERENCE TO RELATED APPLICATIONS

This application is a divisional of application Ser. No. 10/733,974, filed Dec. 11, 2003, which is hereby incorporated by reference herein in its entirety.

FIELD OF THE INVENTION

The invention relates to semiconductor device fabrication and, more particularly, to methods and structures for promoting the stable synthesis of carbon nanotubes.

BACKGROUND OF THE INVENTION

Traditional field effect transistors (FET's) are familiar conventional devices commonly incorporated as a fundamental building block into the intricate circuitry of integrated circuit (IC) chips. Downward scaling of FET dimensions has improved circuit performance and increased the functional capability of FET's packed on an IC chip. However, continued dimensional reductions may be hampered by the size limitations associated with traditional materials and the costs associated with lithographic patterning.

Carbon nanotubes are nanoscale high-aspect-ratio cylinders consisting of hexagonal rings of carbon atoms that may assume either a semiconducting electronic state or a conducting electronic state. Hybrid FET's have been successfully fabricated using a semiconducting carbon nanotube as a channel region and forming contacts at opposite ends of the semiconducting carbon nanotube extending between a gold source electrode and a gold drain electrode situated on the surface of a substrate. A gate electrode is defined in the substrate underlying the carbon nanotube and generally between the source and drain electrodes. An oxidized surface of the substrate defines a gate dielectric situated between the buried gate electrode and the carbon nanotube. Nanotube hybrid FET's should switch reliably while consuming significantly less power than a comparable silicon-based device structure due to the small dimensions of the carbon nanotube. Such FET's have been successfully formed under laboratory conditions by manipulating single semiconducting carbon nanotubes using an atomic force microscope for precision placement or by coincidental placement of a single semiconducting carbon nanotube between the source and drain electrodes from a randomly dispersed group of semiconducting carbon nanotubes.

The availability of carbon nanotubes and the cost of their synthesis is a primary issue hindering their introduction in various potential mass-produced end products, such as IC chips. A conventional method for synthesizing carbon nanotubes is to deposit a layer of catalyst material on a substrate, which may be patterned to form an array of small dots that operate as seed areas for chemical vapor deposition (CVD) growth using a carbonaceous precursor. The carbon nanotubes grow and lengthen by insertion of activated carbon atoms at each nanotube interface with the catalyst material of the seed areas, which remain affixed to the substrate. As the carbon nanotubes lengthen, the flow of CVD reactant(s) to the seed areas becomes restricted, particularly for dense arrays of seed areas. Specifically, the spaces between adjacent carbon nanotubes open for reactant flow may be narrow. Reactants must flow from the vicinity of the leading free end of the carbon nanotubes through the open spaces to reach the catalyst material to participate in the growth reaction. The flow restrictions slows, and may even halt, nanotube synthesis at the seed areas so that the growth rate slows dramatically, and may cease, with increasing nanotube length.

What is needed, therefore, are method and structures of stably synthesizing carbon nanotubes by CVD that are not limited by reactant flow restrictions to the synthesis interface with the catalyst material for seed pads of catalyst material.

SUMMARY OF THE INVENTION

In accordance with the principles of the invention, a method for producing carbon nanotubes includes synthesizing carbon nanotubes to a first length on a plurality of synthesis sites carried by a first substrate. The synthesis of the carbon nanotubes is interrupted and a free end of each of the carbon nanotubes is supported from a second substrate. The method further includes separating the plurality of synthesis sites from the first substrate and resuming the synthesis of the carbon nanotubes at the plurality of synthesis sites to lengthen the carbon nanotubes to a second length that is greater than the first length. As a result, the interface between each synthesis site and the corresponding carbon nanotube has continuous unoccluded, free access to reactant gases for lengthening the carbon nanotubes to a finite length.

The invention is also directed to a structure having a plurality of carbon nanotubes each extending between opposite first and second ends. The first end of each of the plurality of carbon nanotubes is supported on a substrate. The second end of each of the plurality of carbon nanotubes is coupled with one of a plurality of synthesis sites.

Carbon nanotubes may be produced and harvested in large numbers using the simplified preparation process in accordance with the principles of the invention. The invention in its various embodiments fulfills a need for a method of synthesizing lengthy carbon nanotubes at a high growth rate. The methods of the invention may be used to mass produce carbon nanotubes for use in any of their potential and actual applications, whether in semiconductor device fabrication or other diverse applications. Dense arrays of carbon nanotubes may be formed without concerns regarding reactant flow to the synthesis sites.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The invention in its various embodiments provides methods for the stable synthesis of carbon nanotubes synthesized or grown by chemical vapor deposition on seed pads of a growth-promoting catalytic material. The methods generally include forming carbon nanotubes at synthesis sites supported by a first substrate, interrupting nanotube synthesis, mounting a free end of each carbon nanotube to a second substrate, and removing the first substrate. As a result, each carbon nanotube is a freestanding structure capped by one of the synthesis sites and reactant access to the synthesis sites are not occluded by lengthening carbon nanotubes. After forming the non-occluded structures, nanotube synthesis is resumed at the synthesis sites to lengthen the carbon nanotubes.

Figure 1:
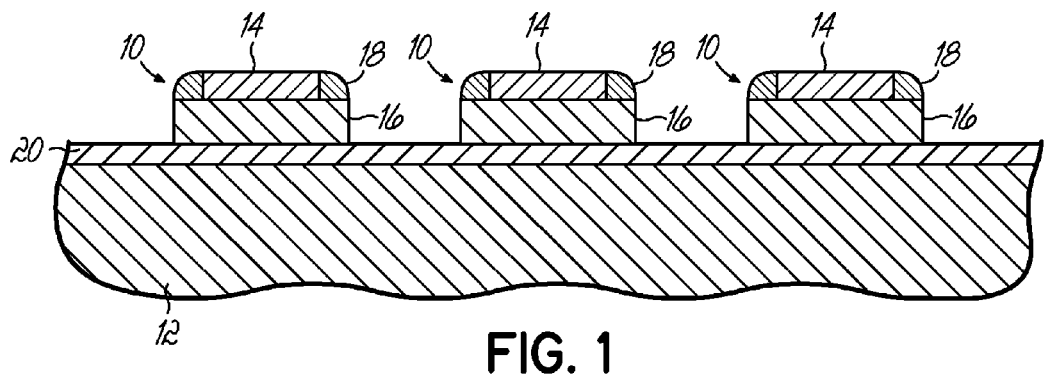
FIGS. 1-6 are cross-sectional views of a portion of a substrate at various stages of a processing method in accordance with an embodiment of the invention.

With reference to FIG. 1, a plurality of spaced-apart synthesis sites 10 are provided on a substrate 12. The synthesis sites 10 may be arranged, for example, in a periodic array of rows and columns extending about the surface of substrate 12. Each synthesis site 10 includes a seed pad 14 of a catalytic material suitable for synthesizing carbon nanotubes (FIG. 2) positioned on an upper surface of a mesa or pillar 16. Substrate 12 may be composed of any suitable support substrate material that does not support the growth of carbon nanotubes, including but not limited to wafers or silicon (Si), gallium arsenide (GaAs), glasses, silicon carbide (SiC), silicon oxide ($SiO_2$), and appropriate metals that do not operate as nanotube catalysts. Pillar 16 is a support element for the seed pad 14 and is formed of any suitable material that likewise does not support the growth of carbon nanotubes. Encircling the periphery of the seed pad 14 and positioned on the pillar 16 is a spacer 18 composed of a material that does not support the synthesis or growth of carbon nanotubes. Underlying the synthesis sites 10 is a release layer 20 that may also function as an etch stop, although a distinct etch stop layer (not shown) may be provided in addition to the release layer 20. A cleaving plane is defined along the horizontal plane of the release layer 20.

In one embodiment of the invention, the release layer 20 is a material removable by a wet etch or any other conventional technique recognized by a person of ordinary skill in the art. The patterned seed pads 14 may be formed by depositing a blanket layer of the catalytic material on the insulating layer 12 by any conventional deposition technique including, but not limited to, chemical vapor deposition (CVD) using suitable precursors such as metal halides, metal oxides and metal carbonyls, sputtering, and physical vapor deposition (PVD) and then employing a standard lithographic and subtractive etch process to pattern the blanket layer. The spacers 18 may be formed about the seed pads 14 by a standard deposition and etch process. The spaced-apart pillars 16 may then be defined by performing a self-aligned anisotropic etch that relies on the seed pads 14 and spacers 18 as a mask and that etches the material of substrate 12 selective to the material constituting seed pads 14 and spacers 18 to the depth of the release layer 20.

The catalytic material in catalyst pads 10 is any material capable of nucleating and supporting the growth of carbon nanotubes when exposed to appropriate reactants under chemical reaction conditions suitable to promote nanotube growth. For example, suitable catalytic materials include, but are not limited to, iron, nickel, cobalt, alloys of each of these metals, and compounds of these metals, such as metal silicides and metal oxides.

References herein to terms such as "vertical", "horizontal", etc. are made by way of example, and not by way of limitation, to establish a frame of reference. The term "horizontal" as used herein is defined as a plane parallel to the conventional plane or surface of substrate 12, regardless of orientation. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood various other frames of reference may be employed without departing from the spirit and scope of the invention.

Figure 2:
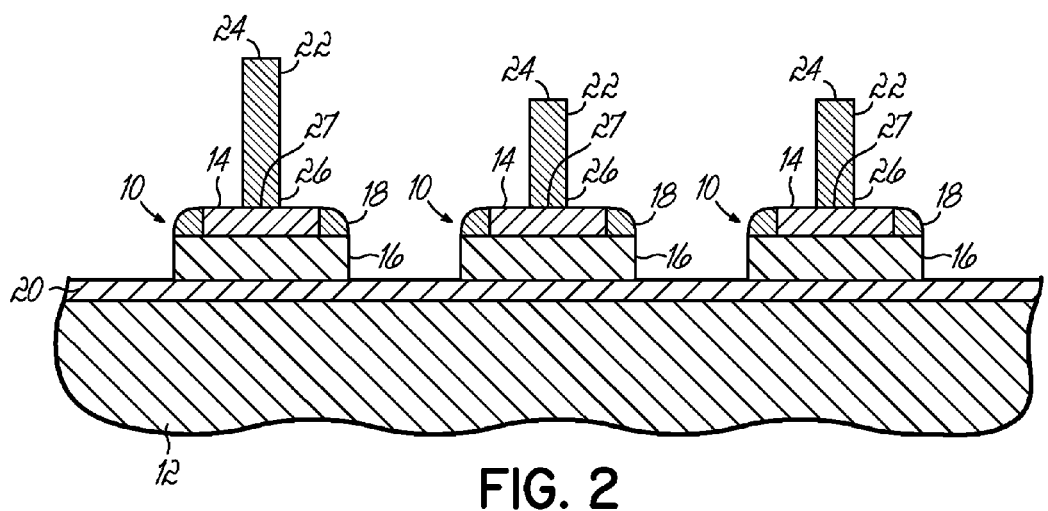

With reference to FIG. 2, carbon nanotubes 22 are grown or otherwise synthesized on seed pads 14 by any suitable growth technique. Synthesis of the carbon nanotubes 22 is suspended temporarily when a relatively-short average length is attained. In one embodiment of the invention, synthesis is discontinued when the carbon nanotubes 22 have an average length in the range of about 100 nm to about 200 nm. Carbon nanotubes 22 are characterized by either a semiconducting electronic state or a conducting electronic state. The specific length at which synthesis is temporarily suspended is shorter than the ultimate length of the nanotubes 22 after nanotube synthesis is resumed, as described herein. The spacer 18 prevents lateral or horizontal nanotube synthesis from the sides of the seed pad 14. Preferably, the surface area of the seed pads 14 is limited or the synthesis conditions are tailored such each seed pad 14 supports the synthesis of only a single carbon nanotube 22, although the invention is not so limited as one or more of the seed pads 14 may carry vertically-projecting multiple carbon nanotubes 22.

In one embodiment of the invention, the carbon nanotubes 22 are grown by chemical vapor deposition (CVD) or plasma-enhanced CVD using any suitable gaseous or vaporized carbonaceous reactant(s) including, but not limited to, carbon monoxide (CO), ethylene ($C_2H_4$), methane ($CH_4$), acetylene ($C_2H_2$), a mixture of acetylene and ammonia ($NH_3$), a mixture of acetylene and nitrogen ($N_2$), a mixture of acetylene and hydrogen ($H_2$), and xylene ($C_6H_4(CH_3)_2$) under growth conditions suitable for promoting carbon nanotube growth on the catalytic material forming the seed pad 14. Substrate 12 may be heated to a temperature adequate to promote and/or hasten CVD growth. Additives may be mixed with the reactant to encourage the synthesis of single-wall nanotubes, the synthesis of multi-wall nanotubes, or to increase the nanotube lengthening rate or length.

The reactant is delivered or supplied to each seed pad 14, where the reactant chemically reacts with the catalyst material to nucleate carbon nanotubes 22 and to sustain their growth following nucleation. The catalyst material of the seed pads 14 participates in carbon nanotube synthesis without itself being transformed or consumed by the chemical reaction transpiring at its exposed surface by reducing the activation energy of the reaction forming carbon nanotubes 22. The carbon nanotubes 22 grow in a collection or population that randomly have either a semiconducting electronic state or a conducting electronic state, as the electronic state may not be selected during growth and, hence, the electronic state of any given nanotube 22 on a given seed pad 14 cannot be predicted with certainty. The carbon nanotubes 22 constitute hollow cylindrical tubes composed of precisely arranged hexagonal rings of bonded carbon atoms. The carbon nanotubes 22 may be multi-wall nanotubes resembling concentric cylinders or may be single-wall nanotubes.

The carbon nanotubes 22 extend on average substantially vertically upward from the seed pad 14 with a perpendicular or, at the least, approximately perpendicular orientation to the horizontal surface of the seed pad 14. The carbon nanotubes 22 are expected to have a statistical distribution of heights or lengths each measured between a free end or leading tip 24 and a base 26 electrically coupled with the corresponding seed pad 14. Growth is expected to occur by addition of carbon atoms at an interface 27 between each of the carbon nanotubes 22 and the corresponding seed pad 14. The invention contemplates that one or all of the carbon nanotubes 22 may be tilted slightly from the vertical direction, as defined herein, and that the nanotube orientation may be characterized by a statistical distribution that, on average, is substantially vertical.

Figure 3:
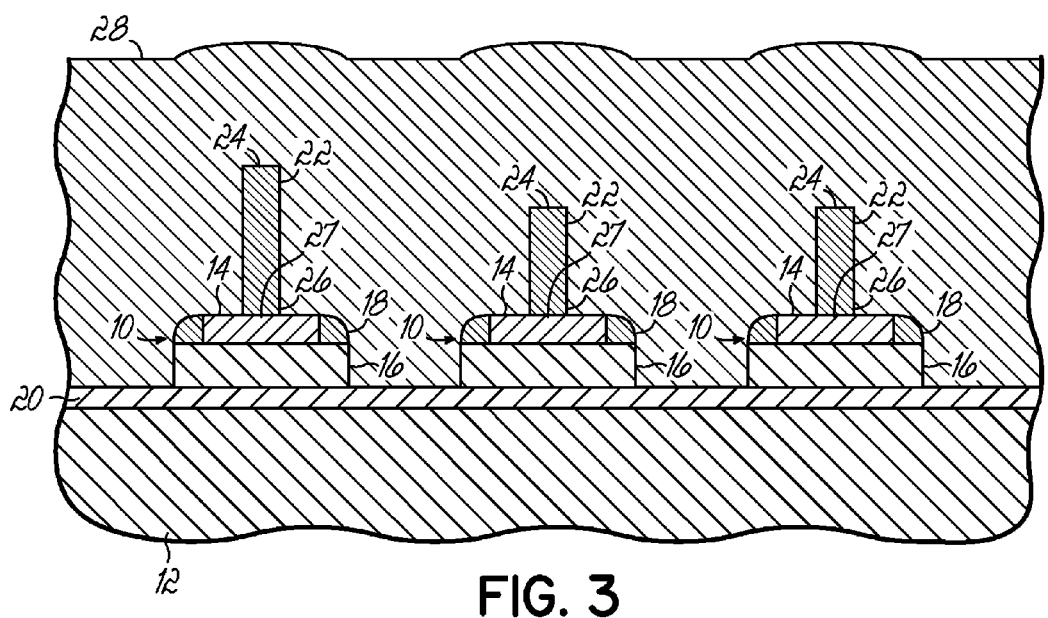

With reference to FIG. 3, a layer 28 is conformally deposited on substrate 12 with a thickness that completely covers the carbon nanotubes 22 and fills the spaces between adjacent synthesis sites 10. Layer 28 may be constituted, for example, by silicon oxide ($SiO_2$) deposited by a CVD process using tetraethylorthosilicate (TEOS) or silane as the silicon precursor source, although the invention is not so limited.

Figure 4:
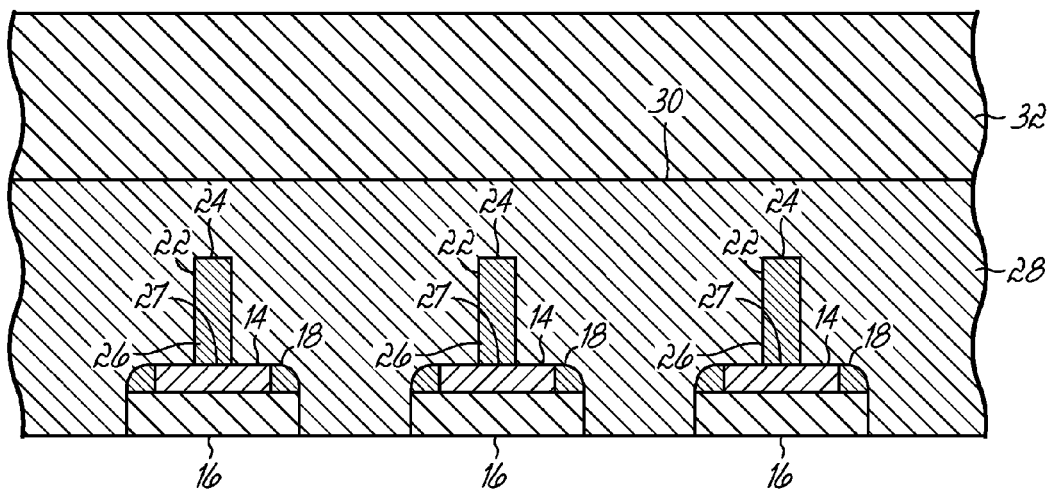

With reference to FIG. 4, an exposed surface 30 of the layer 28 is polished flat by a chemical-mechanical polishing (CMP) process or any other suitable planarization technique. Generally, CMP processes involve a polishing or mechanical abrasion action aided chemically by a suitable slurry introduced between a polishing pad and layer 28. In certain embodiments of the invention, the CMP process is optional and may not be required. A handle wafer 32 is bonded with the exposed surface 30 of layer 28 by any conventional technique familiar to persons of ordinary skill in the art. The handle wafer 32 may be, for example, a silicon wafer or a metal wafer. The handle wafer 32 may be bonded with layer 28, for example, using a layer of high temperature adhesive or by a suitable heat treatment. The handle wafer 32 may be optionally oxide coated or coated with other layers (not shown) to aid bonding. Substrate 12 is then removed by way of manipulation of release layer 20 so that the synthesis sites 10 and dielectric layer 28 remain behind so that the handle wafer 32 provides the requisite mechanical support. For example, the release layer 20 may be manipulated by a wet etch process. Typically, the handle wafer 32 is inverted at this stage in the fabrication process, as indicated in FIG. 4, although the invention is not so limited.

Figure 5:
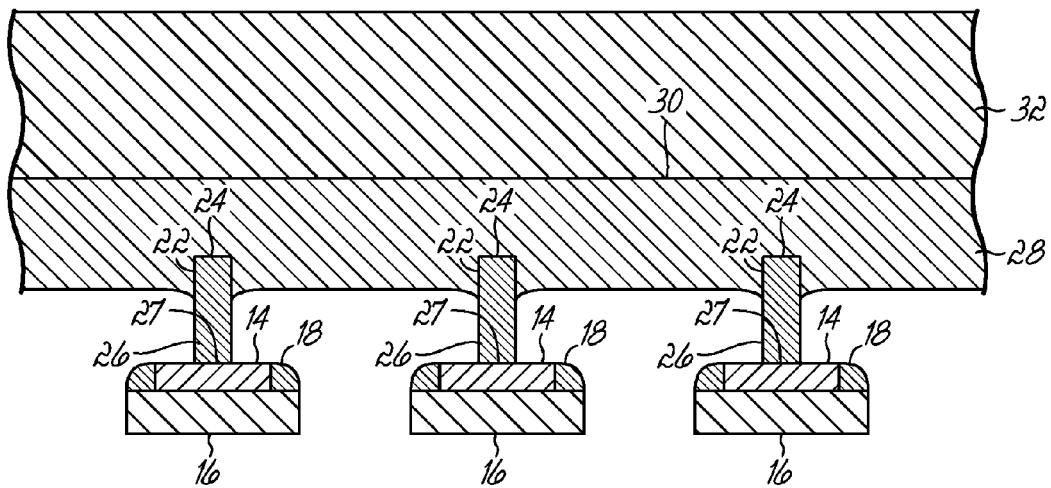

With reference to FIG. 5, layer 28 is removed to a depth that exposes the seed pads 14 and the corresponding interface 27 between each carbon nanotube 22 and the corresponding one of the seed pads 14. One technique for selectively removing layer 28, if layer 28 is constituted by $SiO_2$, relative to the materials in the synthesis sites 10 and the carbon nanotubes 22 is isotropic wet etching with a suitable aqueous etchant solution, such as a buffered hydrofluoric acid (HF) solution. The nanotubes 22 and the associated synthesis sites 10 form structures extending substantially vertically relative to the handle wafer 32. Due to the recessing of layer 28, an unobstructed reactant (i.e., gas) path for nanotube-growth reactant(s) exists to the base 26 of each carbon nanotube 22 and the interface 27 between each base 26 and the associated seed pad 14.

Figure 6:
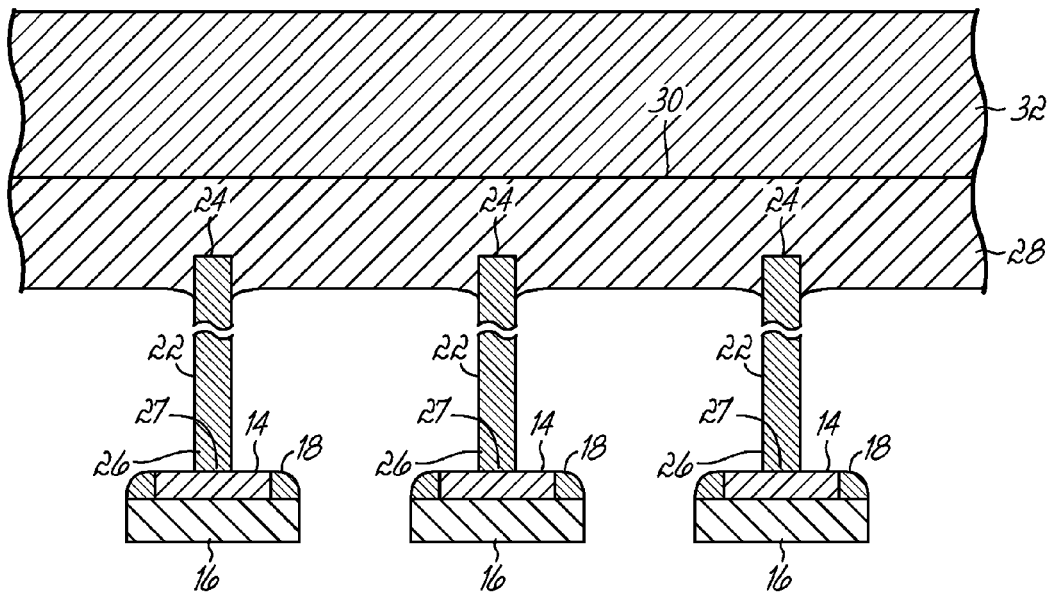

With reference to FIG. 6, the growth or synthesis of the semiconducting carbon nanotubes 22 is reinitiated by supplying the growth reactant(s) at the interface 27 with the associated seed pads 14. Growth proceeds at the same interface 27 with the catalyst material as active in formation of original shorter carbon nanotubes 22. The environment about the interface 27 remains constant as the carbon nanotubes 22 lengthen. In other words, as the carbon nanotubes 22 lengthen, the reactant path to the interface between nanotubes 22 and the associated seed pads 14 is not occluded or otherwise modified by the growth process, even for dense original arrays of synthesis sites 10. As a result, synthesis proceeds unimpeded by the lengthening nanotubes 22.

The carbon nanotubes 22 are synthesized to a desired length and then harvested by excising the synthesis sites 10 and removal from the handle wafer 32 for use in forming microelectronic devices or other structures, such as an array of emitters for a field effect display. Semiconducting and conducting carbon nanotubes 22 may be separated using any appropriate sorting technique apparent to persons of ordinary skill in the art. Alternatively, a device structure incorporating the carbon nanotubes 22 may be fabricated directly on the handle wafer 34, also as apparent to persons of ordinary skill in the art.

Figure 7:
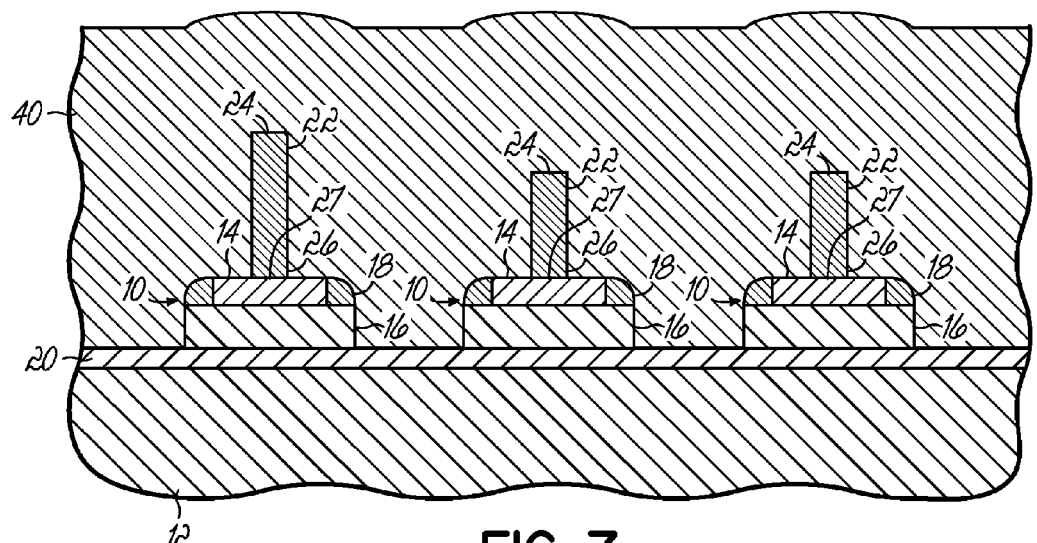
FIGS. 7-13 are cross-sectional views of a portion of a substrate at various stages of a processing method in accordance with an alternative embodiment of the invention.

With reference to FIG. 7 and in accordance with an alternative embodiment of the invention, the substrate 12 at the stage of the processing method shown in FIG. 2 is covered by a layer 40 of a first material, such as polysilicon deposited by a CVD process. The layer 40 conformally coats the carbon nanotubes 22 so that an exposed surface is irregular.

Figure 8:
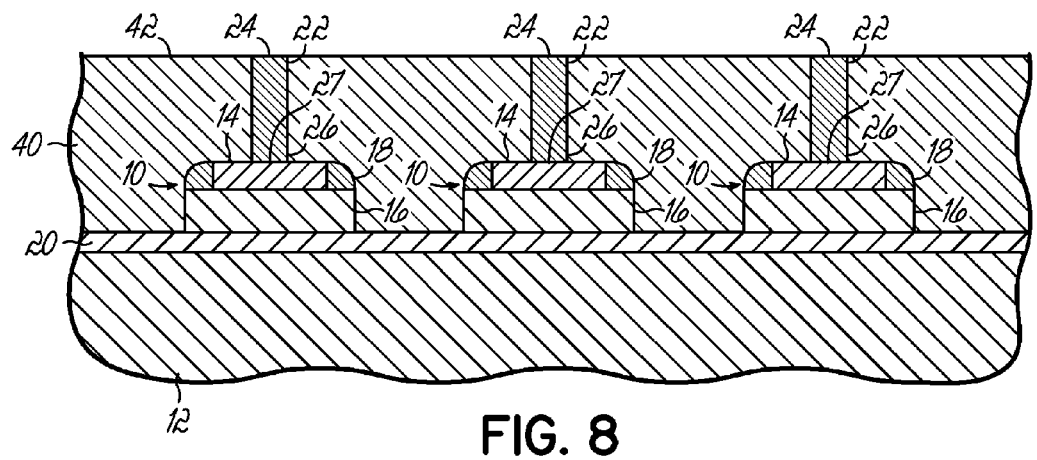

With reference to FIG. 8, surface 42 of the layer 40 is polished flat using a CMP process. The CMP process may also operate to equalize the lengths of the carbon nanotubes 22 as the leading tips 24 of lengthy carbon nanotubes 22 are removed thickness of layer 40 is reduced. The uniform length of the carbon nanotubes 22 following the CMP process will equal the thickness of layer 40 between surface 42 and the confronting surface of the seed pad 14. It will be appreciated that some carbon nanotubes 22 may have lengths shorter than the equalized or uniform length after the CMP process and remain submerged in layer 40 beneath surface 42.

Figure 9:
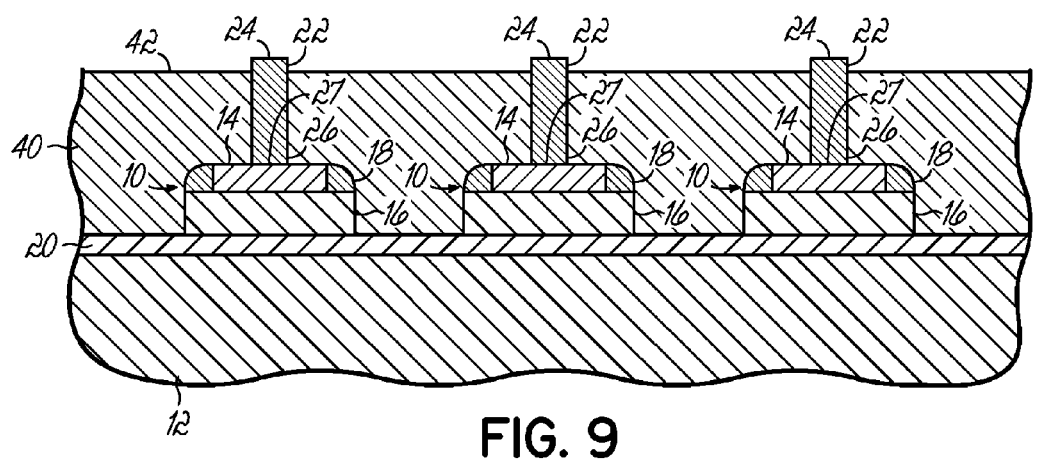
Figure 10:
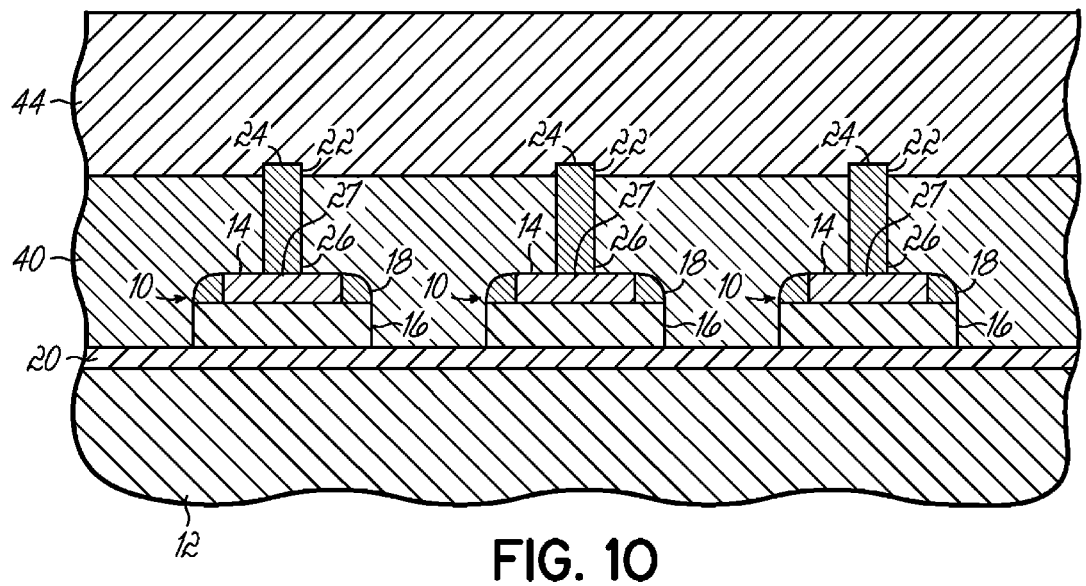

With reference to FIGS. 9 and 10, the exposed surface 42 of layer 40 is then further recessed relative to the carbon nanotubes 22 using a reactive ion etch (RIE) process that removes layer 40 selective to the carbon nanotubes 22. Alternatively, a wet etch process using a suitable etchant solution, such as a buffered hydrofluoric acid (HF) solution for $SiO_2$, may be used. A layer 44 of a second material is then deposited on the exposed surface 42. The exposed leading tips 24 of the carbon nanotubes 22 are embedded in layer 44. Layer 44 is any material that etches selectively to the material forming layer 40 and that does not support carbon nanotube synthesis. If layer 40 is polysilicon, for example, then layer 44 may be, for example, $SiO_2$, as polysilicon may be etched selective to $SiO_2$ by an RIE process using a chlorine-containing gas, a bromine-containing gas, or a mixture thereof.

Figure 11:
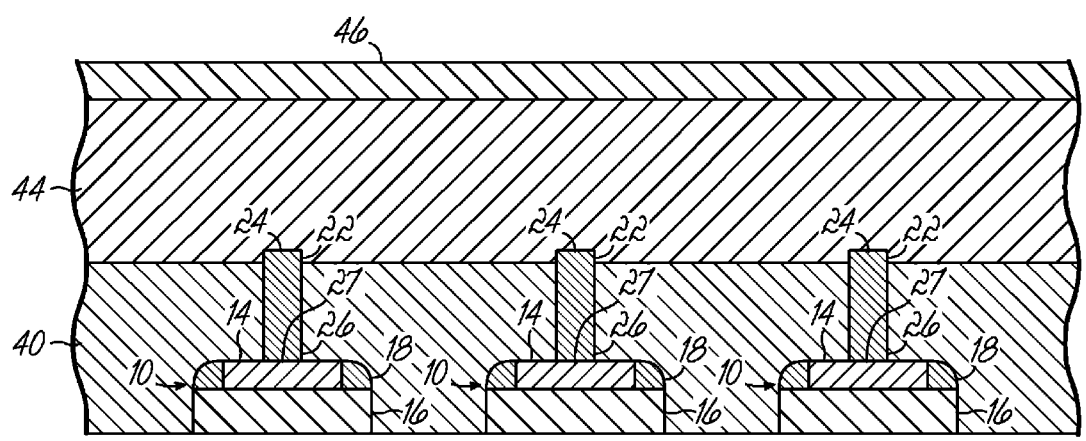

With reference to FIG. 11, a handle wafer 46, such as a silicon wafer or a metal wafer, is bonded with layer 44 by any conventional technique familiar to persons of ordinary skill in the art. The handle wafer 46 may be bonded with layer 44, for example, using a layer of high temperature adhesive or by a suitable heat treatment. The handle wafer 46 may be optionally oxide coated or coated with other layers (not shown) to assist bonding. Substrate 12 is then removed by way of manipulation of release layer 20 so that the synthesis sites 10 and layers 40 and 44 remain behind so that the handle wafer 46 provides the requisite mechanical support. Typically, the handle wafer 46 is inverted at this stage in the fabrication process, as indicated in FIG. 10, although the invention is not so limited.

Figure 12:
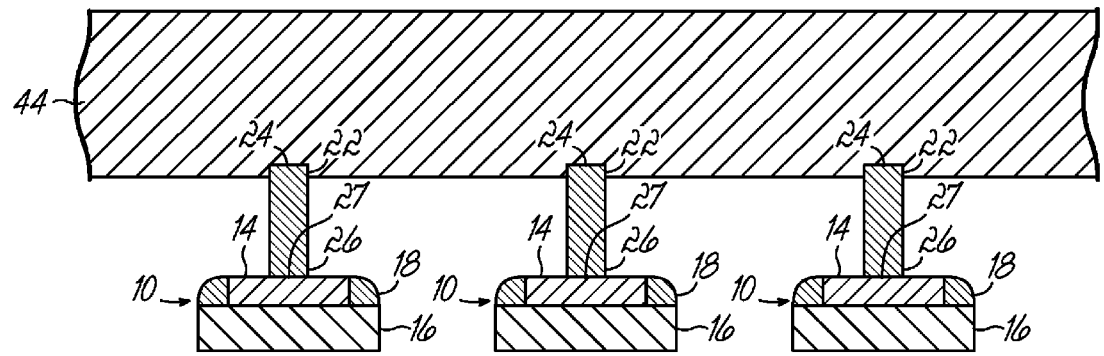

With reference to FIG. 12, layer 40 is removed by an etch process selective to the material constituting layer 44, which functions as an etch stop layer to the etch process. The etch process also removes layer 40 selective to the materials in the synthesis sites 10 and the carbon nanotubes 22. The nanotubes 22 and the associated synthesis sites 10 form structures extending substantially vertically relative to the horizontal plane of the handle wafer 46. Due to the removal of layer 40, an unobstructed gas path for nanotube-growth reactant(s) exists to the base 26 of each carbon nanotube 22 and the interface 27 between each base 26 and the associated seed pad 14.

Figure 13:
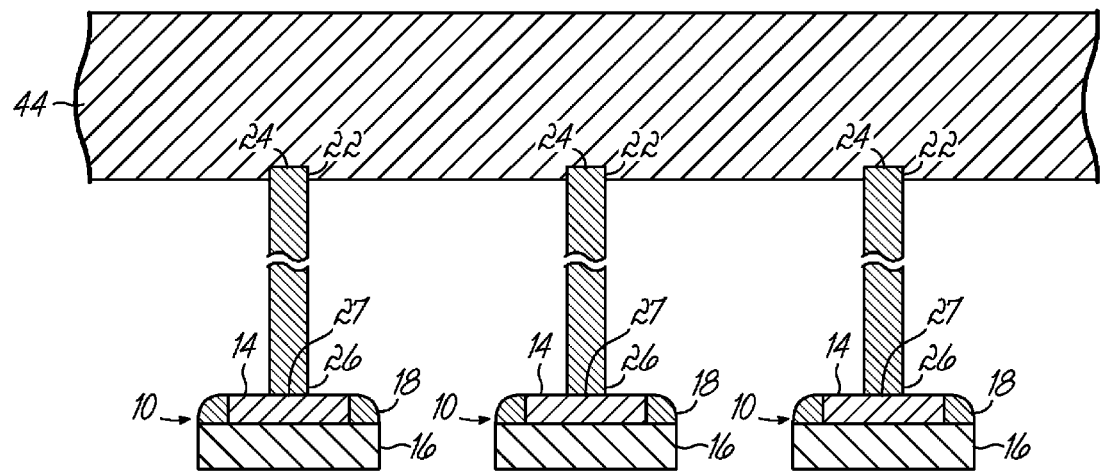

With reference to FIG. 13, the synthesis of the semiconducting carbon nanotubes 22 is reinitiated by supplying the growth reactant(s) at the interface 27 with the associated seed pads 14, which are still affixed to the base 26 of each carbon nanotube 22. Growth proceeds at the same original interface 27 with the catalyst material active during formation of the shorter carbon nanotubes 22. The reactant flow environment about the growth interface 27 remains constant and invariant as the carbon nanotubes 22 lengthen. In other words, as the carbon nanotubes 22 lengthen, the gas path to the interface 27 between nanotubes 22 and the associated seed pads 14 is not occluded or otherwise modified by the growth process, even for dense original arrays of synthesis sites 10, as the seed pads 14 move away from the handle wafer 46 along with the lengthening nanotubes 22. As a result, synthesis proceeds unimpeded by the lengthening nanotubes 22. The carbon nanotubes 22 are synthesized to a desired length and then harvested or incorporated into a device structure. In accordance with this embodiment of the invention, the carbon nanotubes 22 have a substantially uniform length distribution for any length at which the growth is terminated.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A structure comprising:
   a layer of silicon oxide;
   a plurality of synthesis sites, each of the synthesis sites including a seed pad and a spacer peripherally encircling the seed pad, the seed pad composed of a first material that supports carbon nanotube growth and the spacer composed of a second material that does not support the carbon nanotube growth; and
   a plurality of carbon nanotubes, each of said plurality of carbon nanotubes including a first end embedded in said layer of silicon oxide and a second end in a contacting relationship with said seed pad of a respective one of said plurality of synthesis sites.

2. The structure of claim 1 wherein said seed pad of each of the plurality of synthesis sites is sized to support synthesis of one of said plurality of carbon nanotubes.

3. The structure of claim 1 wherein each of said plurality of carbon nanotubes is carried on said seed pad of a corresponding one of the plurality of synthesis sites.

4. The structure of claim 1 wherein said plurality of carbon nanotubes are multi-wall carbon nanotubes.

5. The structure of claim 1 wherein said plurality of carbon nanotubes have a substantially uniform length between said first and second ends.

6. The structure of claim 1 wherein said first material is selected from the group consisting of iron, nickel, cobalt, and compounds and alloys thereof.

7. The structure of claim 6 wherein said spacer is configured to prevent synthesis of said plurality of carbon nanotubes in a direction other than between said layer of silicon oxide and said seed pad.

* * * * *